Oct. 26, 1948.  J. A. CONRADT ET AL  2,452,103
HEADREST
Filed April 15, 1946  2 Sheets-Sheet 1

J. A. Conradt
R. J. Conradt
INVENTORS.

BY
ATTORNEYS.

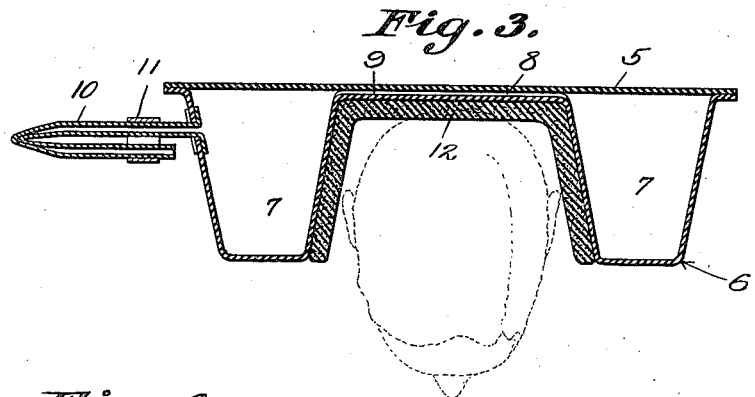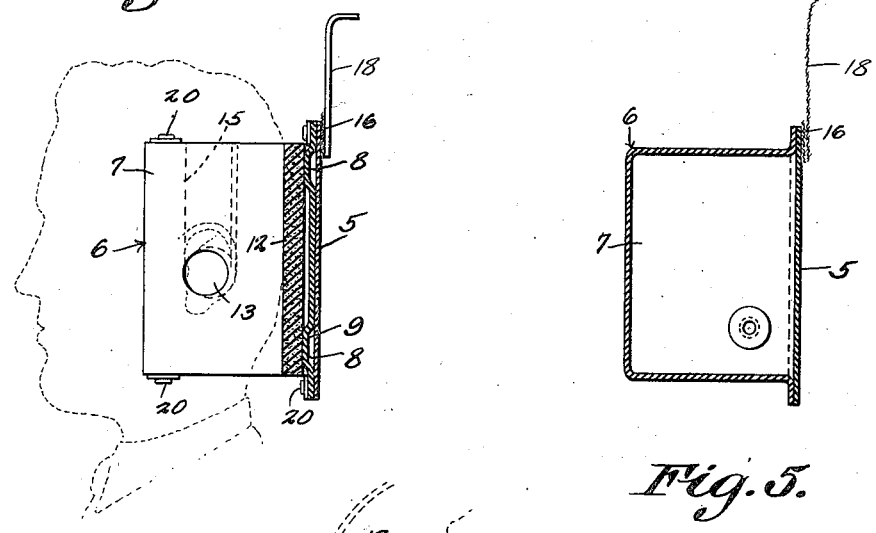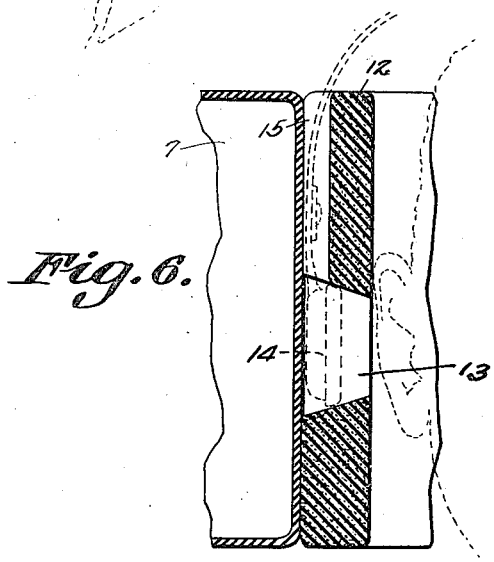

Patented Oct. 26, 1948

2,452,103

UNITED STATES PATENT OFFICE 2,452,103

HEADREST

Julius A. Conradt and Richard J. Conradt,
Rochester, N. Y.

Application April 15, 1946, Serial No. 662,350

1 Claim. (Cl. 155—173)

This invention relates to headrests, the primary object of the invention being to provide a pneumatic headrest which may be deflated so that it may be readily collapsed when not in use to facilitate storing.

An important object of the invention is to provide a headrest in the form of a pneumatic pillow, which may be inflated and secured to the back of a chair in such a way that the person reclining in the chair may rest his head.

Another object of the invention is to provide a headrest of this character, which will not only provide ample support for the head at the back of the head, but will support the head at the sides, for the comfort of the person using the headrest.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Figure 3 is a sectional view taken on line 3—3 of Fig. 1.

Figure 4 is a sectional view taken on line 4—4 of Fig. 2.

Figure 5 is a sectional view taken on line 5—5 of Fig. 2.

Figure 6 is a sectional view taken on line 6—6 of Fig. 2.

Figure 1:
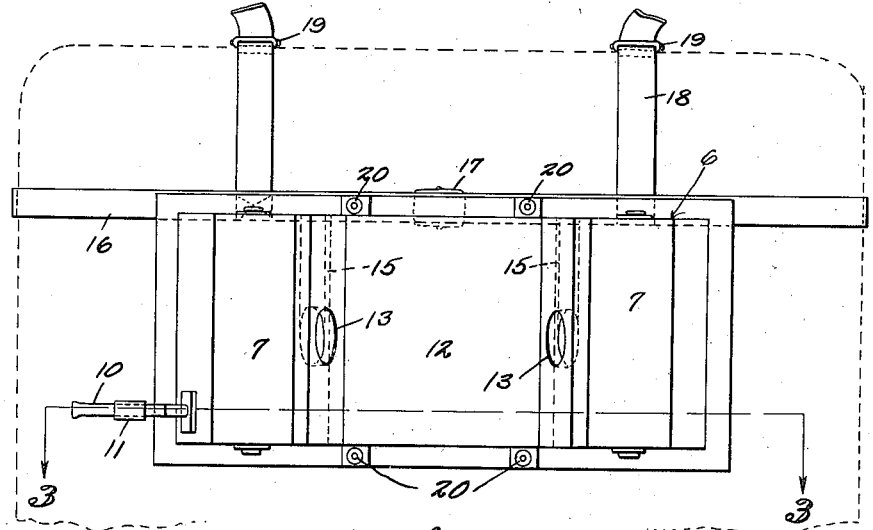
Figure 1 is an elevational view of a headrest constructed in accordance with the invention.
Figure 2:
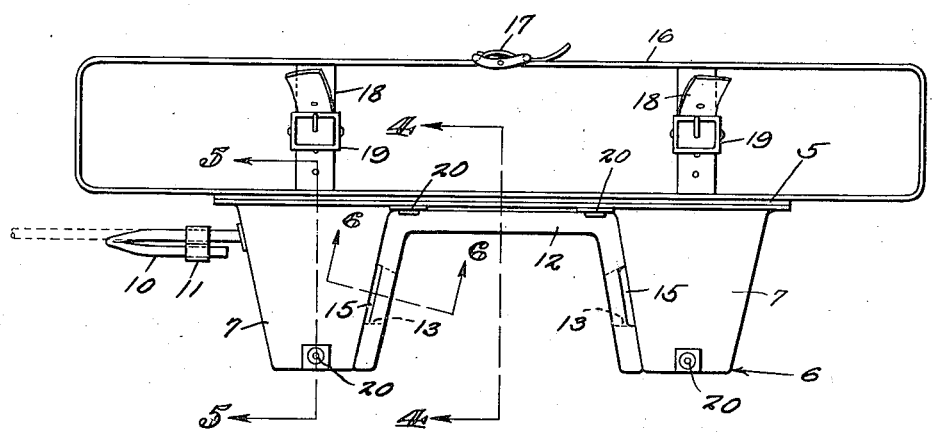
Figure 2 is a plan view thereof.

Referring to the drawings in detail, the pillow comprises a rear section 5 which is constructed of suitable flexible material such as rubber, rubberized fabric or the like. The front section of the headrest is indicated by the reference character 6, and is also constructed of flexible material such as rubber, rubberized fabric or the like, the front section being vulcanized, cemented or otherwise secured to the rear section, around the edges thereof.

The front section is constructed to provide air chambers 7 which have their inner walls spaced apart, providing a space to receive the head of the person using the headrest. The air chambers 7 communicate with each other, through the passageway 8 that is formed between the wall 9 and rear section 5, as clearly shown by Fig. 3 of the drawings.

An inflating tube indicated by the reference character 10 connects with one of the air chambers 7, and through this tube air is directed to the chambers to inflate the chambers. After the air chambers 7 have been properly inflated, the tube 10 is bent upon itself, in a manner as shown by Fig. 3 of the drawings. A band 11 is positioned over the bent or folded tube 10, holding the tube in this bent condition, to prevent deflation of the air chambers through the tube.

The space between the air chambers 7, accommodates the head of the user of the headrest, the walls of the space being covered with the lining 12 which is constructed preferably of sponge or foam rubber, the lining 12 being cemented to the front section of the headrest.

The lining 12 is provided with openings 13 which fall opposite to the ears of the person whose head is resting in the device, the openings being constructed to receive the ear pieces 14 of a radio-receiving set. The walls of the openings 13 are inclined inwardly toward the outer surface of the lining, so that the inclined walls act as a means to secure the ear pieces or receivers, within the openings.

Openings 15 are also formed in the lining 12 that extend to the openings 13, so that the ear pieces may be extended downwardly therethrough.

The reference character 16 indicates the main securing strap of the device, which is secured to the rear section 5 near the upper edge thereof, the strap 16 being provided with a buckle 17, whereby the strap may be secured around the back of a chair or seat with which the device is being used.

Vertical straps 18 connect with the strap 16, and are provided with buckles 19 by means of which the straps 18 may be secured around a seat back.

The reference character 20 indicates socket members of the usual head and socket fasteners, whereby a cover supplied with the heads of the fasteners, may be secured to the headrest to protect the head of the user, if desired.

From the foregoing it will be seen that due to the construction shown and described, I have provided a headrest which when deflated, may be folded into a small and compact article which may be readily inflated and stuck to the back of a chair to support the head of a person reclining in the chair.

It will also be noted that because of the construction of the headrest, the sides of the head will be supported for the comfort of the person.

What is claimed is:

An inflatable headrest constructed of flexible material, comprising a substantially rigid rear section, and a front section secured to the rear section comprising preshaped air chambers, a wall connecting the air chambers and cooperating with the rear wall providing an air passageway therebetween communicating with the air chambers, the adjacent inner walls of the air chambers being inclined throughout their lengths, and providing a space for the reception of the head of the person using the headrest, a soft rubber lining in the space between the inner walls of the air chambers and wall connecting the air chambers for contact by the head of the person using the headrest, and straps for securing the headrest to the back of a chair.

JULIUS A. CONRADT.
RICHARD J. CONRADT.

REFERENCES CITED

The following references are of record in the file of this patent:

UNITED STATES PATENTS

| Number | Name | Date |
| --- | --- | --- |
| 248,823 | Hiller | Oct. 4, 1881 |
| 1,385,355 | Banks | July 26, 1921 |
| 1,401,406 | Hollis | Dec. 27, 1921 |
| 1,515,467 | Draving | Nov. 11, 1924 |

FOREIGN PATENTS

| Number | Country | Date |
| --- | --- | --- |
| 548,990 | Great Britain | Nov. 2, 1942 |